(12) United States Patent
Jotshi et al.

(10) Patent No.: US 9,239,699 B2
(45) Date of Patent: Jan. 19, 2016

(54) ENABLING HARDWARE ACCELERATION IN A COMPUTING DEVICE DURING A MOSAIC DISPLAY MODE OF OPERATION THEREOF

(71) Applicant: NVIDIA Corporation, Santa Clara, CA (US)

(72) Inventors: Praful Jotshi, Maharashtra (IN); Arpit Agrawal, Madhya Pradesh (IN)

(73) Assignee: NVIDIA Corporation, Santa Clara, CA (US)

( * ) Notice: Subject to any disclaimer, the term of this patent is extended or adjusted under 35 U.S.C. 154(b) by 101 days.

(21) Appl. No.: 14/102,326

(22) Filed: Dec. 10, 2013

(65) Prior Publication Data

US 2015/0160911 A1     Jun. 11, 2015

(51) Int. Cl.
*G09G 5/00* (2006.01)
*G06F 15/16* (2006.01)
*G06F 3/14* (2006.01)
*G06T 1/60* (2006.01)
*G06T 1/20* (2006.01)

(52) U.S. Cl.
CPC ............ *G06F 3/1446* (2013.01); *G06F 3/1438* (2013.01); *G06T 1/20* (2013.01); *G06T 1/60* (2013.01); *G09G 2300/026* (2013.01); *G09G 2360/06* (2013.01); *G09G 2360/125* (2013.01)

(58) Field of Classification Search
None
See application file for complete search history.

(56) References Cited

U.S. PATENT DOCUMENTS 7,616,206 B1 * 11/2009 Danilak .................. 345/505
7,995,003 B1 *  8/2011 Diard et al. ............. 345/1.3
8,200,594 B1 *  6/2012 Bleiweiss ................ 706/45

* cited by examiner

*Primary Examiner* — Jacinta M Crawford
(74) *Attorney, Agent, or Firm* — Zilka-Kotab, PC (57) ABSTRACT

A method includes providing a memory unit in a computing device already including a number of processors communicatively coupled to a memory through a system bus, and providing a non-system bus based dedicated channel between the number of processors and the memory unit. The method also includes rendering a different video frame and/or a surface on each processor of the number of processors, and leveraging the memory unit to store a video frame and/or a surface rendered on a processor therein through the non-system bus based dedicated channel. Further, the method includes copying, to other processors, the stored video frame and/or the surface rendered on the processor from the memory unit through the non-system bus based dedicated channel, and scanning out, through the number of processors, the video frame and/or the surface rendered on the processor following the copying to enable display thereof on a corresponding number of displays.

17 Claims, 10 Drawing Sheets

ENABLING HARDWARE ACCELERATION IN A COMPUTING DEVICE DURING A MOSAIC DISPLAY MODE OF OPERATION THEREOF

FIELD OF TECHNOLOGY

This disclosure relates generally to display systems and, more particularly, to enabling hardware acceleration in a computing device during a mosaic display mode of operation thereof.

BACKGROUND

A display system may include a computing device (e.g., a data processing device such as a laptop computer, a desktop computer, a notebook computer, a netbook, a mobile device such as a mobile phone or a tablet) and a display unit. The computing device may include a number of processors (e.g., Graphics Processing Units (GPUs)) corresponding to a number of displays (e.g., Liquid Crystal Displays (LCDs)) constituting the display unit. During a mosaic display mode of operation, the number of processors is presented to an operating system executing on the computing device as a single logical processor. Thus, content to be displayed on each display is consolidated as a whole and displayed on the number of displays.

In a typical scenario of the mosaic display mode of operation, each processor may render a same video frame/surface but may scan out only a part thereof. This may be due to hardware acceleration not being possible in the aforementioned mosaic display mode of operation. The rendering of the same video frame/surface on each of the processors may constitute a waste of computing resources.

SUMMARY

Disclosed are a method, an apparatus and/or a system of enabling hardware acceleration in a computing device during a mosaic display mode of operation thereof.

In one aspect, a method includes providing a memory unit in a computing device already including a number of processors communicatively coupled to a memory through a system bus, and providing a non-system bus based dedicated channel between the number of processors and the memory unit. The method also includes rendering a different video frame and/or a surface on each processor of the number of processors, and leveraging the memory unit to store a video frame and/or a surface rendered on a processor therein through the non-system bus based dedicated channel. Further, the method includes copying, to other processors of the number of processors, the stored video frame and/or the surface rendered on the processor from the memory unit through the non-system bus based dedicated channel, and scanning out, through the number of processors, the video frame and/or the surface rendered on the processor following the copying to enable display thereof on a corresponding number of displays communicatively coupled to the number of processors in a mosaic display mode where the number of processors is presented to an operating system executing on the computing device as a single logical processor.

In another aspect, a non-transitory medium, readable through a computing device and including instructions embodied therein that are executable through the computing device, is disclosed. The non-transitory medium includes instructions compatible with a memory unit provided in the computing device, with the computing device already including a number of processors communicatively coupled to a memory through a system bus, and instructions compatible with providing a non-system bus based dedicated channel between the number of processors and the memory unit. The non-transitory medium also includes instructions to render a different video frame and/or a surface on each processor of the number of processors, and instructions to leverage the memory unit to store a video frame and/or a surface rendered on a processor therein through the non-system bus based dedicated channel.

Further, the non-transitory medium includes instructions to copy, to other processors of the number of processors, the stored video frame and/or the surface rendered on the processor from the memory unit through the non-system bus based dedicated channel, and instructions to scan out, through the number of processors, the video frame and/or the surface rendered on the processor following the copying to enable display thereof on a corresponding number of displays communicatively coupled to the number of processors in a mosaic display mode where the number of processors is presented to an operating system executing on the computing device as a single logical processor.

In yet another aspect, a computing device includes a memory, a number of processors communicatively coupled to the memory through a system bus, a number of displays corresponding to the number of processors, and a memory unit interfaced with the number of processors through a non-system bus based dedicated channel therebetween. The number of processors is configured to render a different video frame and/or a surface on each processor thereof, to leverage the memory unit to store a video frame and/or a surface rendered on a processor therein through the non-system bus based dedicated channel, to enable copying, to other processors thereof, the stored video frame and/or the surface rendered on the processor from the memory unit through the non-system bus based dedicated channel, and to scan out the video frame and/or the surface rendered on the processor following the copying to enable display thereof on the corresponding number of displays communicatively coupled to the number of processors in a mosaic display mode where the number of processors is presented to an operating system executing on the computing device as a single logical processor.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, an apparatus and/or a system of enabling hardware acceleration in a computing device during a mosaic display mode of operation thereof. Although the present embodiments have been described with reference to specific example embodiments, it will be evident that various modifications and changes may be made to these embodiments without departing from the broader spirit and scope of the various embodiments.

Figure 1:
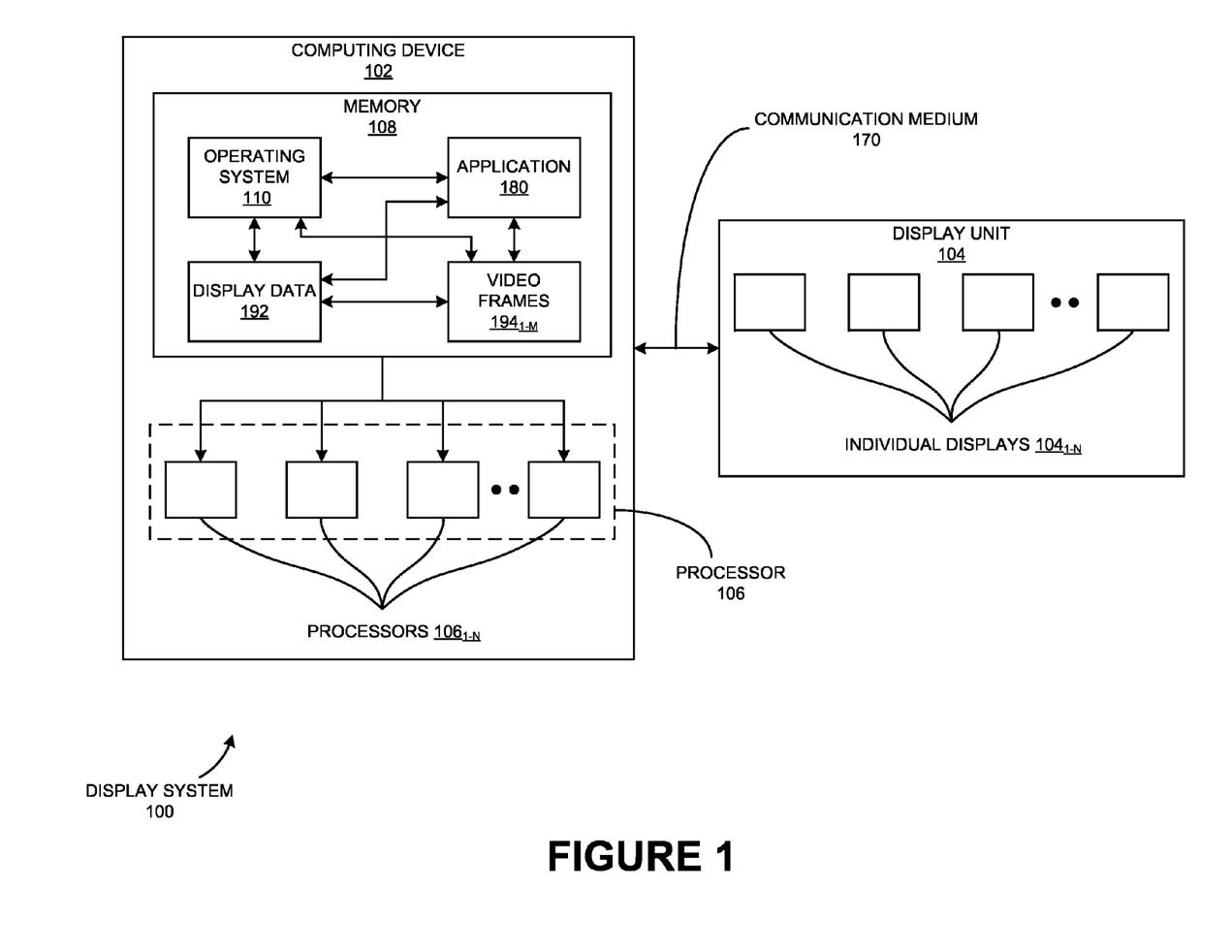
FIG. 1 is a schematic view of a display system, according to one or more embodiments.

FIG. 1 shows a display system 100, according to one or more embodiments. In one or more embodiments, display system 100 may include a computing device 102 (e.g., a desktop computer, a laptop computer, a notebook computer, a netbook, a mobile device such as a mobile phone or a tablet) configured to have data associated therewith displayed on a display unit 104 (e.g., a wall projector). In one or more embodiments, display unit 104 may include a number of individual displays $104_{1-N}$ (e.g., Liquid Crystal Displays (LCDs)), each of which is configured to display a portion of the data. In one or more embodiments, content to be displayed on the number of individual displays $104_{1-N}$ may be consolidated through a processor 106 (e.g., a set of Graphics Processing Units (GPUs), Central Processing Units (CPUs) and/or other forms of processors) of computing device 102 as a contiguous set of data.

For the aforementioned purpose, in one or more embodiments, processor 106 may include a number of processors $106_{1-N}$ (e.g., Central Processing Units (CPUs), Graphics Processing Units (GPUs), processor cores or a combination thereof) therein; each port of a constituent processor $106_{1-N}$ may correspond to an individual display $104_{1-N}$. In the case of processor 106 utilizing NVIDIA®'s Scalable Link Interface (SLI) technology, two or more graphics card(s) may be linked together to generate a single output therefrom. In one or more other embodiments, one or more of the number of processors $106_{1-N}$ may be part of processor 106 (e.g., a quad-core GPU) instead of all of the number of processors $106_{1-N}$ constituting processor 106.

While exemplary embodiments have been discussed with regard to a single computing device 102, it is obvious that there may be more than one computing device providing data to be rendered on the number of individual displays $104_{1-N}$. It would then be obvious from the paragraphs below that only a minor modification to the processes discussed herein with regard to implementation with a single computing device 102 may be required. In one or more embodiments, computing device 102 may include a memory 108 (e.g., volatile memory, non-volatile memory) communicatively coupled to processor 106/the number of processors $106_{1-N}$. While FIG. 1 shows a single memory 108 as being communicatively coupled to the number of processors $106_{1-N}$, it is obvious that each of the number of processors $106_{1-N}$ may be associated with one or more separate memories. Therefore, alternately, memory 108 may include individual memories associated with the number of processors $106_{1-N}$.

Further, it is obvious that an operating system 110 and, optionally, an application 180 may execute on computing device 102. FIG. 1 shows operating system 110 as being stored in memory 108 (e.g., non-volatile memory); application 180 is also shown as being stored in memory 108. For example, application 180 may provide a user interface to control settings and/or parameters associated with the number of individual displays $104_{1-N}$ and/or data to be displayed therein. In one or more embodiments, operating system 110 of computing device 102 may support a mosaic display mode where multiple processors $106_{1-N}$ may be presented to operating system 110 as a single logical processor; thus, in the case of SLI technology being employed in the mosaic mode, content displayed on display unit 104 may be generated as a consolidation/assemblage of content displayed on the constituent number of individual displays $104_{1-N}$. For example, display unit 104 may display an entire car; the content displayed on the constituent individual displays $104_{1-N}$ may be aggregated as a whole to form the entire car.

Figure 2:
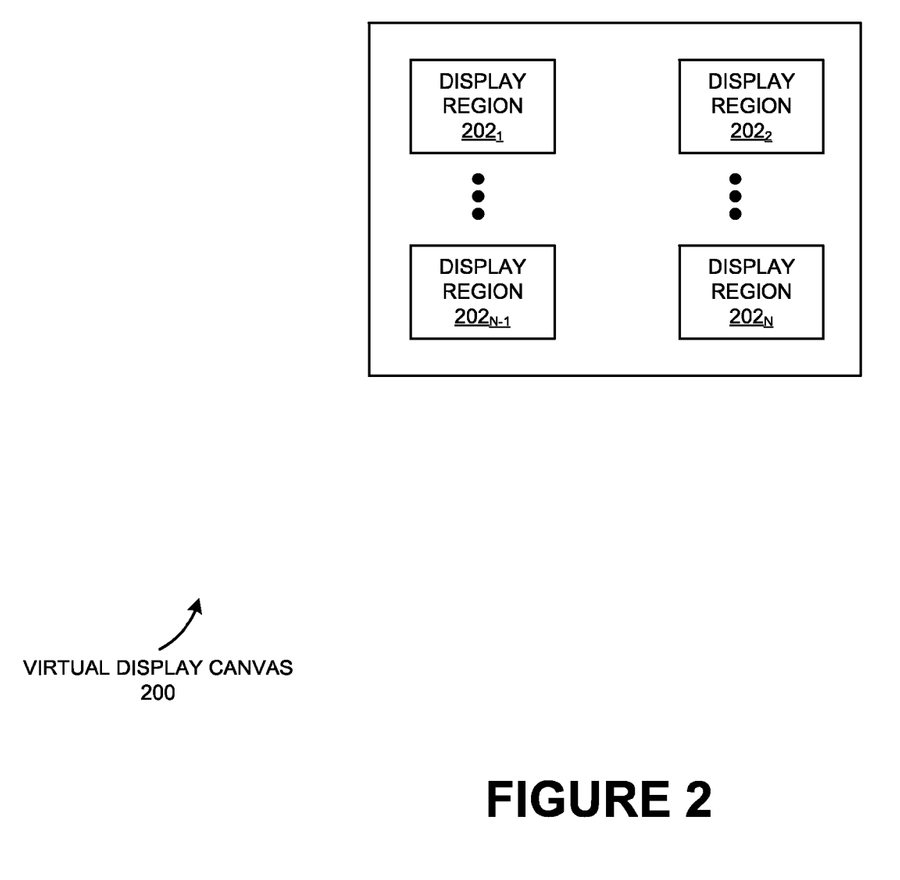
FIG. 2 is a schematic view of a virtual display canvas corresponding to the display unit of the display system of FIG. 1.

Thus, each individual display $104_{1-N}$ may define a unique uniform region with a virtual display canvas provided by operating system 110. FIG. 2 shows virtual display canvas 200 as including display regions $202_{1-N}$, each of which corresponds to an individual display $104_{1-N}$. In one or more embodiments, once the number of processors $106_{1-N}$ complete processing of data to generate display data, the aforementioned display data may be sent as one or more frames over a communication medium 170 (e.g., a cable, over a communication network such as a Local Area Network (LAN) and/or a Wide Area Network (WAN)) to the corresponding individual displays $104_{1-N}$. The transmission of pixel data for a frame over communication medium 170 following processing through the number of processors $106_{1-N}$ may be known as scanout. Thus, it is obvious that virtual display canvas 200 may correspond to a scanout area for a frame.

Figure 3:
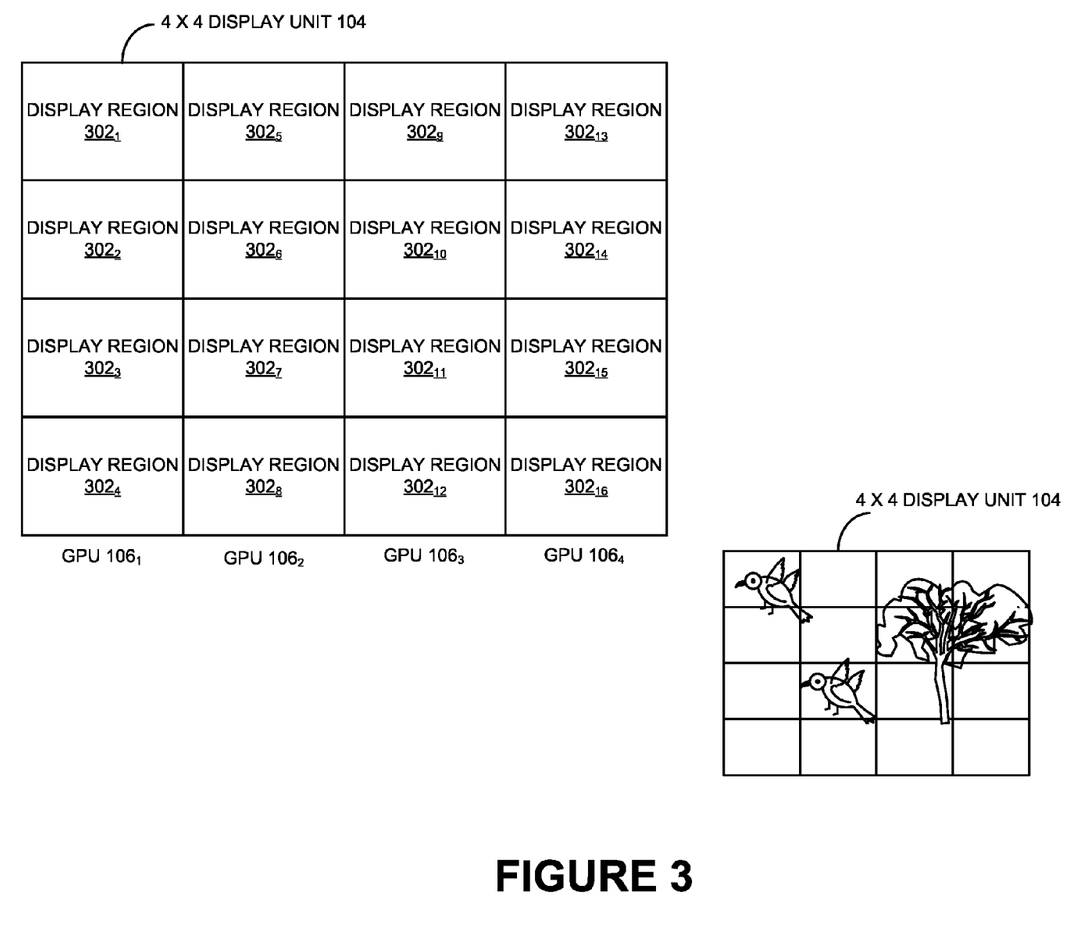
FIG. 3 is a schematic view of an example 4×4 display unit with 16 display regions therein.

FIG. 3 shows an example 4×4 display unit 104 with 16 display regions $302_{1-16}$ therein. Here, display regions $302_{1-4}$ may correspond to a GPU $106_1$, display regions $302_{5-8}$ may correspond to GPU $106_2$, display regions $302_{9-12}$ may corresponding to GPU $106_3$ and display regions $302_{13-16}$ may correspond to GPU $106_4$. GPUs $106_{1-4}$ are example processors $106_{1-N}$; each of GPUs $106_{1-4}$ may include four GPU heads therein. Following processing of display data (e.g., display data 192 shown as being stored in memory 108 in FIG. 1) associated with a video frame/image (e.g., video frames $194_{1-M}$ shown as being associated with display data 192), GPUs $106_{1-4}$ may render an entire video frame $194_{1-M}$; however, each of GPUs $106_{1-4}$ may merely scan out a portion of video frame $194_{1-M}$. If video frame $194_{1-M}$ corresponds to a consolidated display provided by the 4×4 display unit 104, each of the four heads of GPU $106_1$ may merely scan out data corresponding to display regions $302_{1-4}$, each of the four heads of GPU $106_2$ may merely scan out data corresponding to display regions $302_{5-8}$, each of the four heads of GPU $106_3$ may merely scan out data corresponding to display regions $302_{9-12}$ and each of the four heads of GPU $106_4$ may merely scan out data corresponding to display regions $302_{13-16}$.

Figure 4:
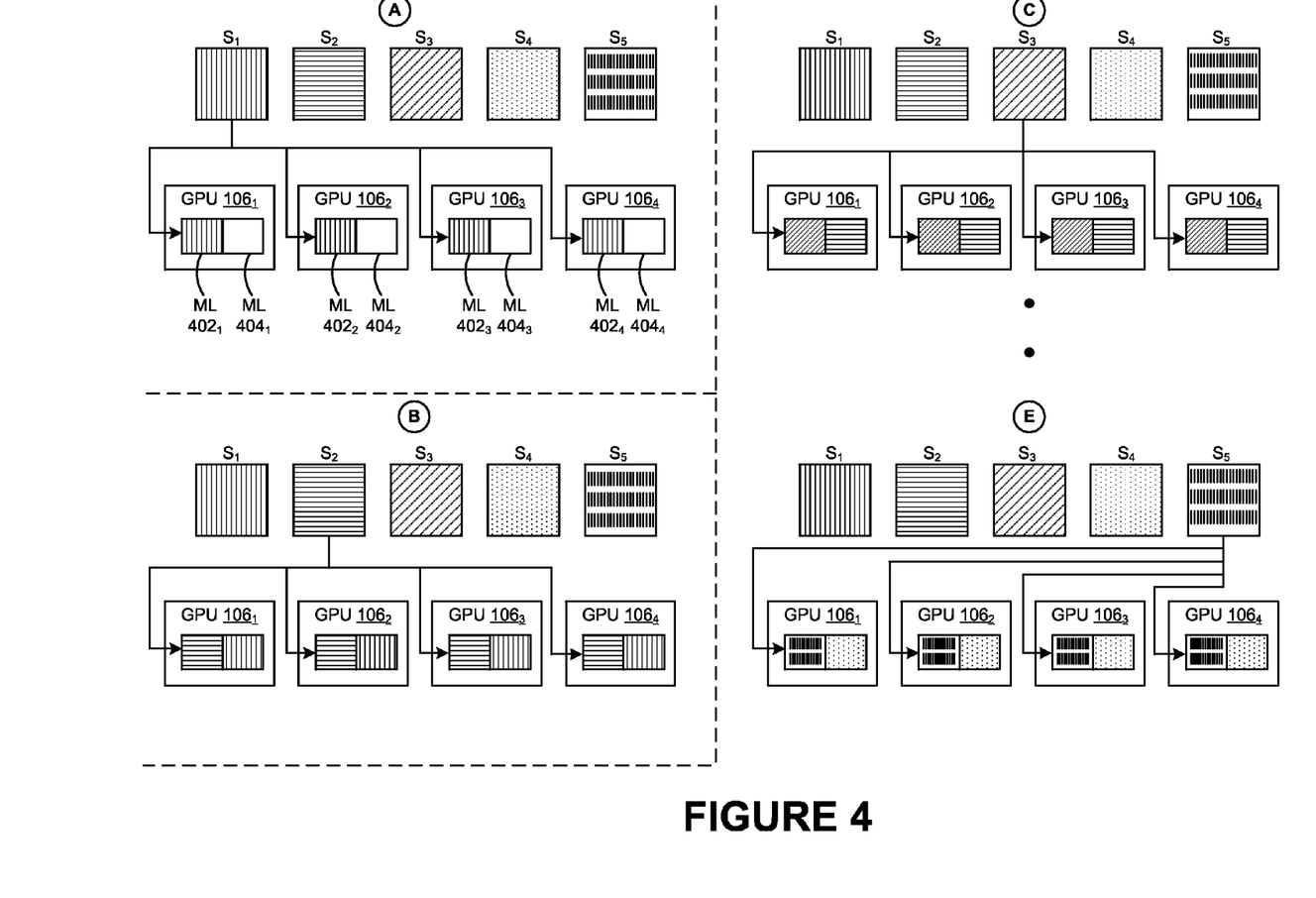
FIG. 4 is an illustrative view of example rendering and scanout processes in a mosaic display mode involving a set of five video frames/surfaces and four Graphics Processing Units (GPUs).

FIG. 4 illustrates example rendering and scanout processes in a mosaic display mode involving a set of five video frames/surfaces ($S_{1-5}$; $S_{1-5}$ may be regarded as part of video frames $194_{1-M}$) and four GPUs $106_{1-4}$. It is obvious that each of the four GPUs $106_{1-4}$ may include one or more GPU heads therein. Here, it may be assumed that each GPU $106_{1-4}$ may be associated with two locations in memory 108—one for storing the video frame/surface for scanout and another for storing the video frame/surface for rendering. As seen in FIG. 4, $S_1$ first may be rendered on all GPUs $106_{1-4}$ and saved in a corresponding memory location (ML) $402_{1-4}$ thereof. MLs $404_{1-4}$ associated with scanout may be empty. Both MLs $402_{1-4}$ and MLs $404_{1-4}$ may be regarded as locations in memory 108. When rendering of $S_1$ is completed, $S_1$ may be scanned out; now, $S_2$ may start rendering on all GPUs $106_{1-4}$. As shown in FIG. 4, MLs $402_{1-4}$ may now include $S_2$ and MLs $404_{1-4}$ may now include $S_1$. Then, when $S_2$ completes rendering, $S_2$ may be scanned out; and $S_3$ may start rendering on all GPUs $106_{1-4}$. The process may continue until $S_5$ may be rendered on all GPUs $106_{1-4}$ and then scanned out.

Figure 5:
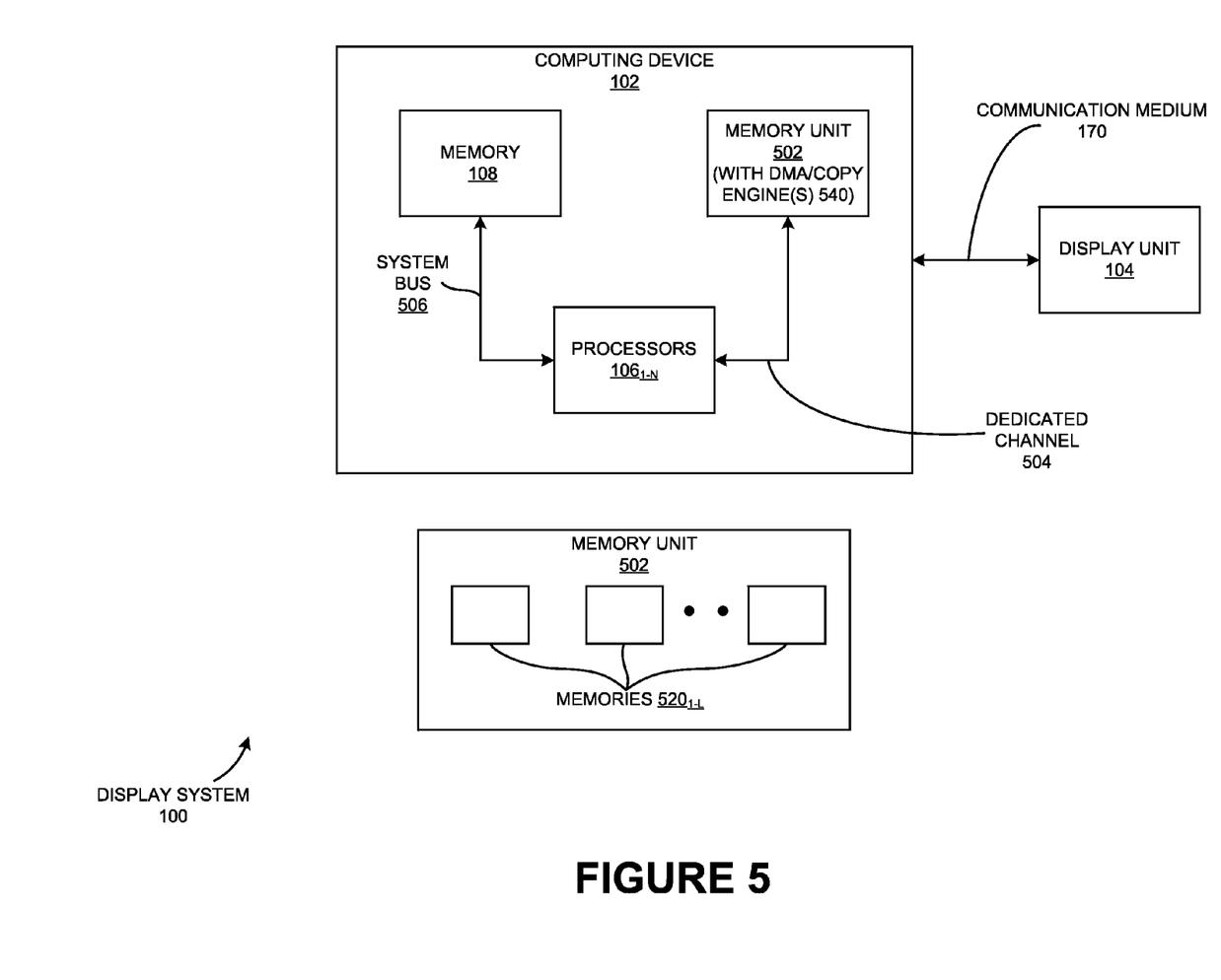
FIG. 5 is a schematic view of the display system of FIG. 1 additionally including a memory unit for the number of processors thereof, according to one or more embodiments.

As implied from the above discussion and FIG. 4, no hardware acceleration may be provided during the example rendering and scanout processes discussed above. As each GPU $106_{1-4}$ renders part of a surface that is not required to be scanned out, the abovementioned may also constitute a waste of processing/computing resources. FIG. 5 shows a hardware addition to display system 100 of FIG. 1 by way of providing a memory unit 502 for the number of processors $106_{1-N}$, according to one or more embodiments. In one or more embodiments, a dedicated channel 504 may be provided between the number of processors $106_{1-N}$ and memory unit 502 to enable one or more memories thereof store the rendered video frames/surfaces, and then transfer the aforementioned rendered video frames/surfaces to the appropriate processors $106_{1-N}$ as and when required. For example, dedicated channel 504 may not involve the system bus; FIG. 5 shows the number of processors $106_{1-N}$ and memory 108 being coupled to each other through a system bus 506. System bus 506 may be understood by one of ordinary skill in the art as a bus coupling internal components (e.g., processors $106_{1-N}$, memory 108) of computing device 102 to a motherboard (not shown) thereof.

Figure 6:
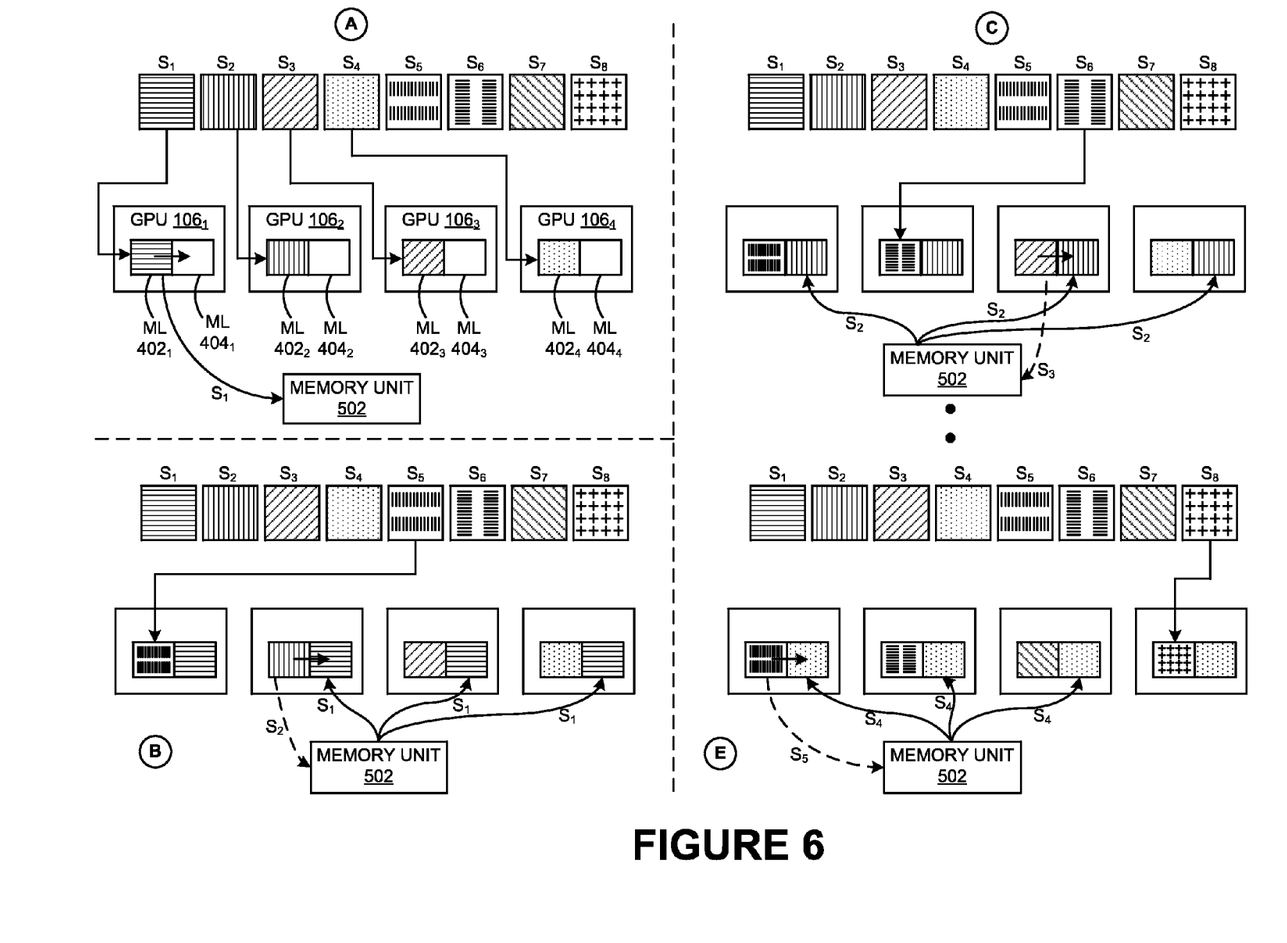
FIG. 6 is an illustrative view of example rendering and scanout processes in a mosaic display mode involving a set of video frames/surfaces, four GPUs and the memory unit in the display system of FIG. 1 and FIG. 5.

In one or more embodiments, with regard to providing memory unit 502 discussed above, no changes may be required on the side of the number of processors $106_{1-N}$. In one or more embodiments, dedicated Direct Memory Access (DMA)/copy engines (e.g., DMA/copy engine(s) 540 shown in FIG. 5; hardware or a combination of hardware and software engines) may be employed to transfer the abovementioned video frames/surfaces between memory unit 502 and processors $106_{1-N}$. For example, memory unit 502 may be part of a hardware solution such as NVIDIA®'s G-SYN™. FIG. 6 illustrates example rendering and scanout processes in a mosaic display mode involving a set of video frames/surfaces $S_{1-8}$ (again, $S_{1-8}$ may be regarded as part of video frames $194_{1-M}$), four GPUs $106_{1-4}$ and memory unit 502, according to one or more embodiments. It should be noted that memory unit 502 may include one or more individual memories $520_{1-L}$ (shown in FIG. 5) associated with each GPU $106_{1-4}$. Alternately, memory unit 502 may be a single memory associated with all GPUs $106_{1-4}$.

In one or more embodiments, now, each GPU $106_{1-4}$ may be configured to render a different surface thereon. FIG. 6 shows GPU $106_1$ rendering surface $S_1$, GPU $106_2$ rendering surface $S_2$, GPU $106_3$ rendering surface $S_3$ and GPU $106_4$ rendering surface $S_4$. Therefore, at first, MLs $402_{1-4}$ may include $S_{1-4}$ and MLs $404_{1-4}$ may be empty. In one or more embodiments, once rendering of $S_1$ is done, GPU $106_1$ may be configured to copy $S_1$ both to ML $404_1$ for scanout and to memory unit 502, as shown in FIG. 6. In one or more embodiments, the other GPUs $106_{2-4}$ may then be configured to copy $S_1$ from memory unit 502 to MLs $404_{2-4}$ thereof for scanout. At the same time, $S_5$ may start rendering on GPU $106_1$ (stored in ML $402_1$). Then, GPU $106_2$ may be configured to copy $S_2$ to both ML $404_2$ for scanout and memory unit 502, as shown in FIG. 6. In one or more embodiments, the other GPUs $106_{1,3-4}$ may copy $S_2$ from memory unit 502 to MLs $404_{1,3-4}$ for scanout. At the same time, $S_6$ may start rendering on GPU $106_2$ (stored in ML $402_2$). The process may continue unit $S_8$ is rendered and scanned out. Moreover, as seen in FIG. 6, speedup of the rendering and the scanout processes may be achieved; further, as GPUs $106_{1-4}$ render different surfaces at the same time, duplicate work may be avoided.

Figure 7:
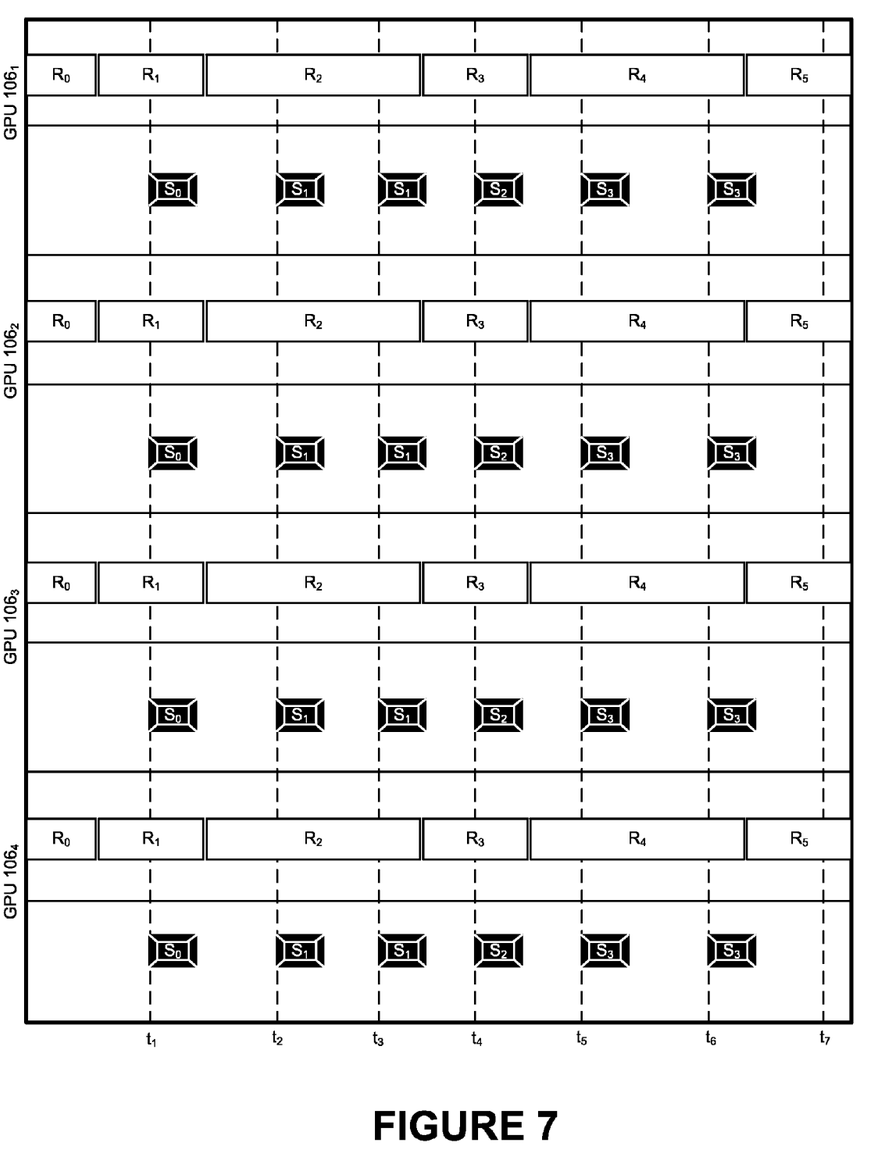
FIG. 7 is an illustrative view of a timeline of the rendering and the scanout processes of FIG. 4.

FIG. 7 summarizes a timeline of the rendering and the scanout processes discussed with regard to FIG. 4. As GPUs $106_{1-4}$ render every surface in entirety thereof, the pipeline may be sequential. This implies that if a video frame/surface is not processed within a refresh cycle, the rendering may stall and surfaces $S_1$ and $S_3$ may be scanned out for two cycles; thus, surfaces till $S_3$ may alone be scanned out by the end of time interval $t_6$ ($t_1$-$t_7$ are time intervals associated with the rendering and the scanout processes). In other words, only four video frames/surfaces may be processed within $t_6$. Here, $R_{0-5}$ may be associated with rendered surfaces. Thus while only surfaces till $S_3$ may be scanned out by the end of $t_6$, surfaces $S_{0-5}$ may be rendered therewithin.

Figure 8:
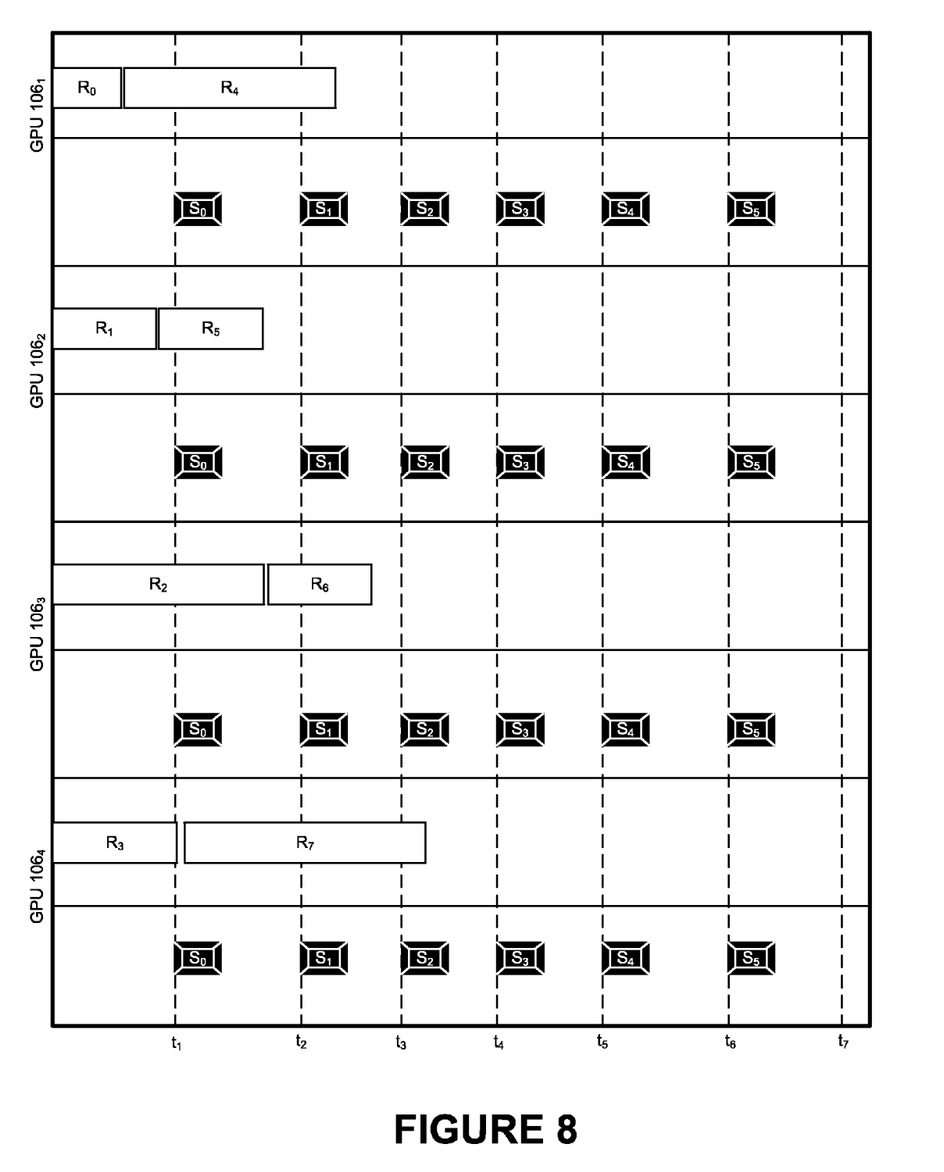
FIG. 8 is an illustrative view of a timeline of the rendering and the scanout processes of FIG. 6.

FIG. 8 summarizes a timeline of the rendering and the scanout processes discussed with regard to FIG. 6, according to one or more embodiments. As seen in FIG. 8, rendering may be completed in a smaller time frame compared to the rendering in FIG. 7 as each GPU $106_{1-4}$ may render a different video frame/surface at the same time. In an example scenario, surfaces till $S_5$ may be scanned out within the time interval $t_6$. Thus, six video frames/surfaces may be processed within $t_6$. Again, $R_{0-7}$ may be associated with rendered surfaces.

Thus, in one or more embodiments, utilization of the number of processors $106_{1-N}$ (or, GPUs $106_{1-4}$) may be enhanced. In other words, in one or more embodiments, the same surface/video frame may not be required to be rendered on multiple processors $106_{1-N}$. Further, in one or more embodiments, overall rendering time of the surfaces/video frames may be reduced; in addition, system resources may be conserved.

It should be noted that there are no limitations on the number of heads of GPUs $106_{1-4}$. In one example embodiment, each GPU $106_{1-4}$ may merely include one head and in other example embodiments, each GPU $106_{1-4}$ may include a number of heads. Further, it is obvious that the four GPUs, viz. GPUs $106_{1-4}$ discussed above are merely for example purposes. The number of GPUs may be more than four or less than four.

Figure 9:
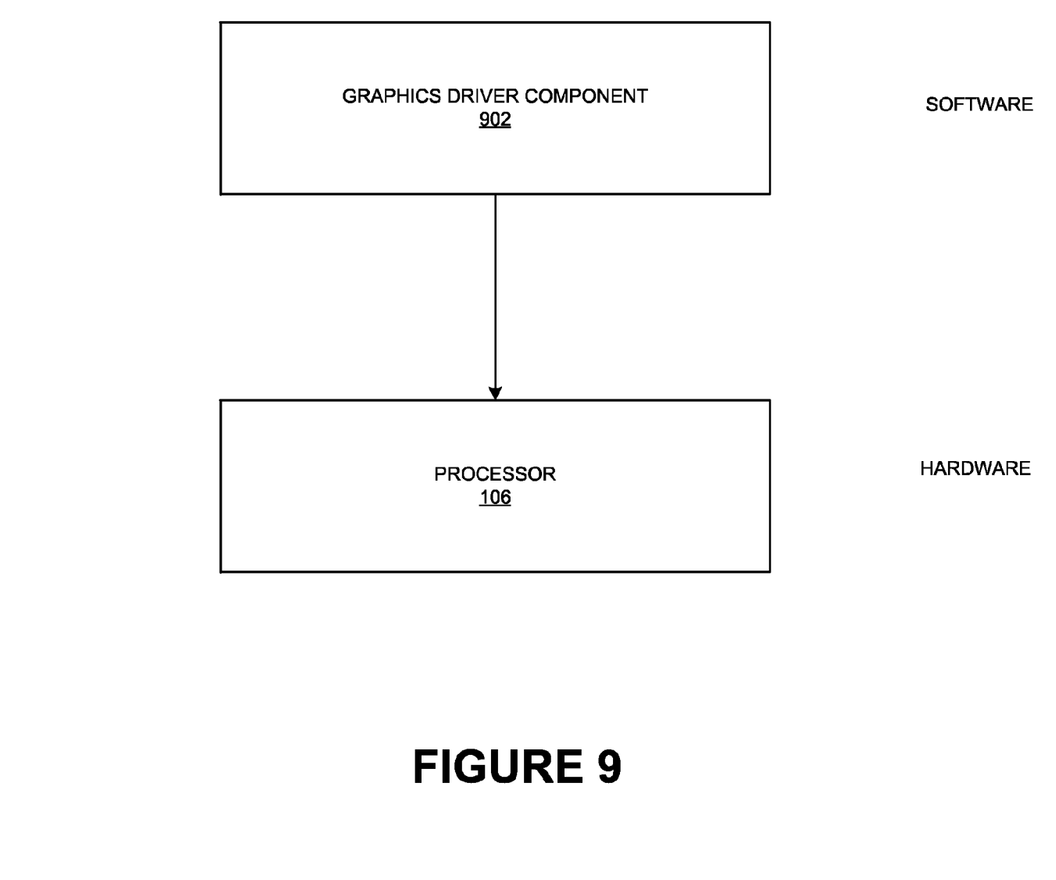
FIG. 9 is a schematic view of interaction between a graphics driver component and the processor of the computing device of the display system of FIG. 1, according to one or more embodiments.

FIG. 9 shows interaction between a graphics driver component 902 (e.g., a software driver) and processor 106 (or, the number of processors $106_{1-N}$), according to one or more embodiments. In one or more embodiments, graphics driver component 902 may issue commands to processor 106 when a routine thereof is involved by a calling application program (e.g., executing on processor 106; an example application program may be application 180). In one or more embodiments, said commands may enable processor 106 render different video frames/surfaces on the constituent number of processors $106_{1-N}$ thereof, leverage memory unit 502 to store the rendered video frames/surfaces (also discussed above) and/or copy the appropriate rendered video frames/surfaces from memory unit 502 for scanout.

In one or more embodiments, instructions associated with graphics driver component 902, the leveraging of memory unit 502 for storing rendered surfaces and/or enabling processor 106 copy the stored rendered surfaces from memory unit 502 may be embodied in a non-transitory medium (e.g., Compact Disc (CD), Digital Video Disc (DVD), Blu-Ray Disc®, hard drive) readable through computing device 102 and executable therethrough. Also, graphics driver component 902 and/or the aforementioned instructions may be provided packaged with operating system 110 and/or application 180. All reasonable variations are within the scope of the exemplary embodiments discussed herein.

Figure 10:
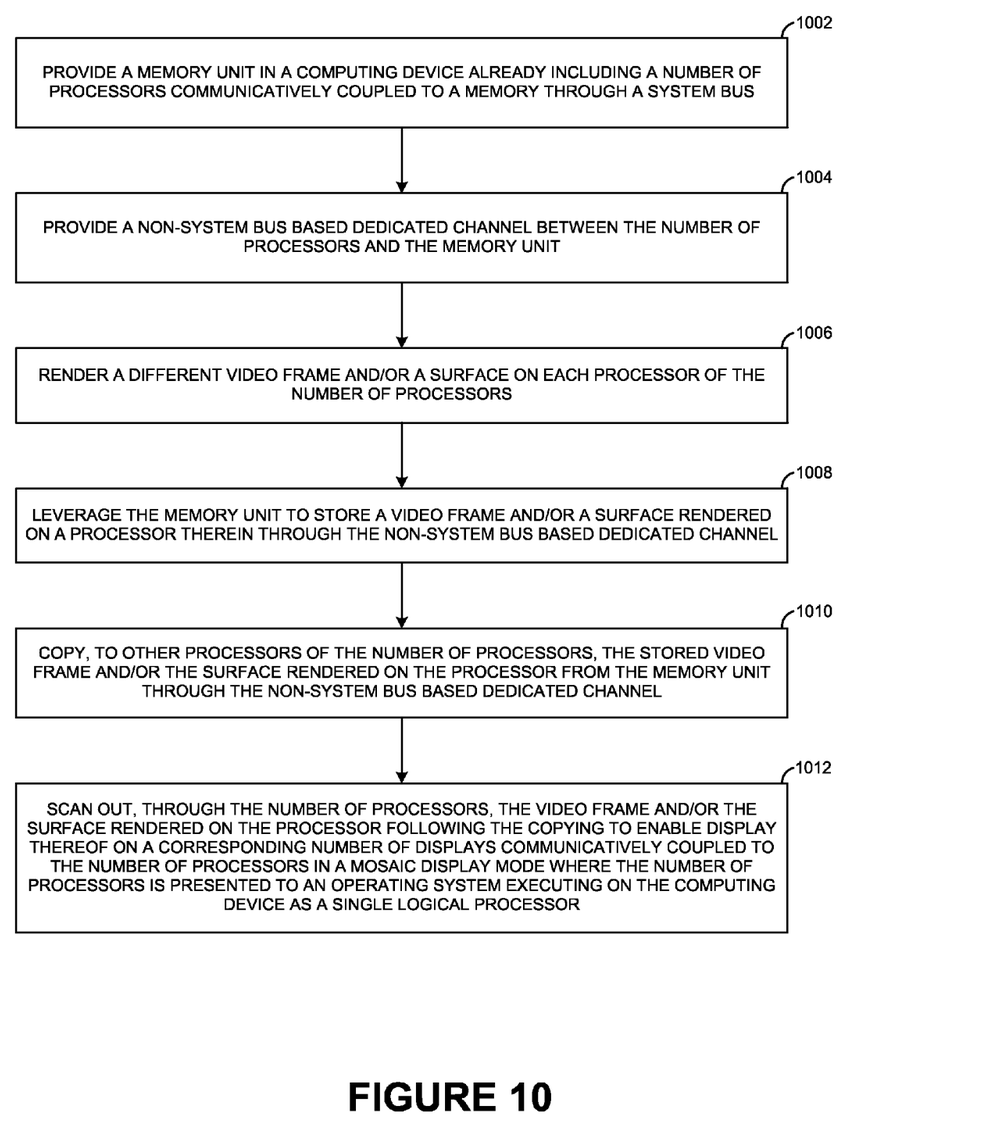
FIG. 10 is a process flow diagram detailing the operations involved in enabling hardware acceleration in the computing device of the display system of FIG. 1 during a mosaic display mode of operation thereof, according to one or more embodiments.

FIG. 10 shows a process flow diagram detailing the operations involved in enabling hardware acceleration in computing device 102 during a mosaic display mode of operation thereof, according to one or more embodiments. In one or more embodiments, operation 1002 may involve providing memory unit 502 in computing device 102 already including a number of processors $106_{1-N}$ communicatively coupled to memory 108 through system bus 506. In one or more embodiments, operation 1004 may involve providing a non-system bus based dedicated channel 504 between the number of processors $106_{1-N}$ and memory unit 502. In one or more embodiments, operation 1006 may involve rendering a different video frame and/or a surface on each processor $106_{1-N}$ of the number of processors $106_{1-N}$.

In one or more embodiments, operation 1008 may involve leveraging memory unit 502 to store the video frame and/or a surface rendered on a processor $106_{1-N}$ therein through dedicated channel 504. In one or more embodiments, operation 1010 may then involve copying, to other processors $106_{1-N}$ of the number of processors $106_{1-N}$, the stored video frame and/or the surface rendered on processor $106_{1-N}$ from memory unit 502 through dedicated channel 504. In one or more embodiments, operation 1012 may then involve scanning out, through the number of processors $106_{1-N}$, the video frame and/or the surface rendered on processor $106_{1-N}$ following the copying to enable display thereof on a corresponding number of displays $104_{1-N}$ communicatively coupled to the number of processors $106_{1-N}$ in a mosaic display mode where the number of processors $106_{1-N}$ is presented to operating system 110 executing on computing device 102 as a single logical processor.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a non-transitory machine-readable medium). For example, the various electrical structure and methods may be embodied using transistors, logic gates, and electrical circuits (e.g., Application Specific Integrated Circuitry (ASIC) and/or Digital Signal Processor (DSP) circuitry).

In addition, it will be appreciated that the various operations, processes, and methods disclosed herein may be embodied in a non-transitory machine-readable medium and/or a machine accessible medium compatible with a data processing system (e.g., a computer device), and may be performed in any order (e.g., including using means for achieving the various operations). Various operations discussed above may be tangibly embodied on a non-transitory machine-readable medium readable through computing device 102 to perform functions through operations on input and generation of output. These input and output operations may be performed by a processor (e.g., processor 106). The non-transitory machine-readable medium readable through computing device 102 may be, for example, a memory (e.g., hard disk), a transportable medium such as a CD, a DVD, a Blu-Ray Disc®, a floppy disk or a diskette. The non-transitory machine-readable medium may include instructions embodied therein that are executable on computing device 102.

A computer program embodying the aspects of the exemplary embodiments may be loaded onto computing device 102. The computer program is not limited to specific embodiments discussed above, and may, for example, be implemented in an operating system, an application program, a foreground or a background process, a driver, a network stack or any combination thereof. For example, software associated with graphics driver component 902 may be available on the non-transitory machine-readable medium readable through computing device 102. The computer program may be executed on a single computer processor or multiple computer processors.

Accordingly, the specification and drawings are to be regarded in an illustrative rather than a restrictive sense.

What is claimed is:

1. A method comprising:
providing a memory unit in a computing device already comprising a plurality of processors communicatively coupled to a memory through a system bus, each processor of the plurality of processors having a corresponding memory location in the memory that is specific to the processor and each processor of the plurality of processors being connected to a corresponding one of a plurality of displays;
providing a non-system bus based dedicated channel between the plurality of processors and the memory unit such that the plurality of processors share the memory unit;
for each processor of the plurality of processors:
rendering, by the processor, a different at least one of: a video frame and a surface,
storing, through the system bus by the processor in the memory location of the memory corresponding to the processor, the rendered at least one of: the video frame and the surface,
storing, through the non-system bus based dedicated channel by the processor in the shared memory unit, the rendered at least one of:
the video frame and the surface,
wherein each of the other processors of the plurality of processors copy the rendered at least one of: the video frame and the surface from the shared memory unit to the memory location of the memory corresponding to the other processor, such that each processor of the plurality of processors has a copy of the rendered at least one of: the video frame and the surface stored the corresponding memory location of the memory;

for each processor of the plurality of processors, scanning out, from the corresponding memory location to the corresponding display, the rendered at least one of: the video frame and the surface, to enable display thereof on the plurality of displays in a mosaic display mode, where the plurality of processors is presented to an operating system executing on the computing device as a single logical processor.

2. The method of claim 1, further comprising providing a plurality of memories as part of the memory unit.

3. The method of claim 1, further comprising providing a plurality of heads as part of the each processor of the plurality of processors.

4. The method of claim 1, wherein a driver component associated with the plurality of processors triggers operations of the plurality of processors.

5. The method of claim 4, comprising providing the driver component packaged with at least one of: an application executing on the computing device and the operating system executing on the computing device.

6. The method of claim 1, further comprising providing at least one of: a Direct Memory Access (DMA) engine and a copy engine in the computing device to transfer the rendered at least one of: the video frame and the surface between the memory unit and the other processors of the plurality of processors.

7. A non-transitory medium, readable through a computing device and comprising instructions embodied therein that are executable through the computing device, comprising:

instructions compatible with a memory unit provided in the computing device, the computing device already comprising a plurality of processors communicatively coupled to a memory through a system bus, each processor of the plurality of processors having a corresponding memory location in the memory that is specific to the processor and each processor of the plurality of processors being connected to a corresponding one of a plurality of displays;

instructions compatible with providing a non-system bus based dedicated channel between the plurality of processors and the memory unit such that the plurality of processors share the unit;

for each processor of the plurality of processors:
  instructions to render, by the processor, a different at least one of: a video frame and a surface,
  instructions to store, through the non-system bus based dedicated channel by the processor in the shared memory unit, the rendered at least one of: the video frame and the surface,
  wherein each of the other processors of the plurality of processors copy the rendered at least one of: the video frame and the surface from the shared memory unit to the memory location of the memory corresponding to the other processor, such that each processor of the plurality of processors has a copy of the rendered at least one of: the video frame and the surface stored the corresponding memory location of the memory;

for each processor of the plurality of processors, instructions to scan out, from the corresponding memory location to the corresponding display, the rendered at least one of: the video frame and the surface, to enable display thereof on the plurality of displays in a mosaic display mode, where the plurality of processors is presented to an operating system executing on the computing device as a single logical processor.

8. The non-transitory medium of claim 7, further comprising instructions compatible with a plurality of memories provided as part of the memory unit.

9. The non-transitory medium of claim 7, further comprising instructions compatible with a plurality of heads provided as part of the each processor of the plurality of processors.

10. The non-transitory medium of claim 7, wherein a driver component associated with the plurality of processors triggers operations of the plurality of processors.

11. The non-transitory medium of claim 7, further comprising instructions compatible with at least one of: a DMA engine and a copy engine provided in the computing device to transfer the rendered at least one of: the video frame and the surface between the memory unit and the other processors of the plurality of processors.

12. A computing device comprising:
a memory;
a plurality of processors communicatively coupled to the memory through a system bus, each processor of the plurality of processors having a corresponding memory location in the memory that is specific to the processor and each processor of the plurality of processors being connected to a corresponding one of a plurality of displays;
a plurality of displays each corresponding to one of the plurality of processors; and
a memory unit interfaced with the plurality of processors through anon-system bus based dedicated channel therebetween such that the plurality of processors share the memory unit,
wherein each processor of the plurality of processors is configured for:
  rendering, by the processor, a different at least one of: a video frame and a surface,
  storing, through the system bus by the processor in the memory location of the memory corresponding to the processor, the rendered at least one of: the video frame and the surface,
  storing, through the non-system bus based dedicated channel by the processor in the shared memory unit, the rendered at least one of: the video frame and the surface,
  wherein each of the other processors of the plurality of processors copy the rendered at least one of: the video frame and the surface from the shared memory unit to the memory location of the memory corresponding to the other processor, such that each processor of the plurality of processors has a copy of the rendered at least one of: the video frame and the surface stored the corresponding memory location of the memory, and
wherein each processor of the plurality of processors is further configured for scanning out, from the corresponding memory location to the corresponding display, the rendered at least one of: the video frame and the surface, to enable display thereof on in a mosaic display mode, where the plurality of processors is presented to an operating system executing on the computing device as a single logical processor.

13. The computing device of claim 12, wherein the memory unit comprises a plurality of memories therein.

14. The computing device of claim 12, wherein the each processor of the plurality of processors comprises a plurality of heads therein.

15. The computing device of claim 12, wherein a driver component associated with the plurality of processors triggers operation of the plurality of processors.

16. The computing device of claim 15, wherein the driver component is provided packaged with at least one of: an application executing on the computing device and the operating system executing on the computing device.

17. The computing device of claim 12, further comprising at least one of a DMA engine and a copy engine to transfer the rendered at least one of: the video frame and the surface between the memory unit and the other processors of the plurality of processors.

* * * * *